United States Patent
Ohashi et al.

(10) Patent No.: US 11,373,379 B2
(45) Date of Patent: Jun. 28, 2022

(54) IMAGE GENERATION APPARATUS AND IMAGE GENERATION METHOD FOR GENERATING AUGMENTED REALITY IMAGES BASED ON USER INTERACTION

(71) Applicant: Sony Interactive Entertainment Inc., Tokyo (JP)

(72) Inventors: Yoshinori Ohashi, Tokyo (JP); Masaomi Nishidate, Tokyo (JP); Norihiro Nagai, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/268,857

(22) PCT Filed: Aug. 23, 2018

(86) PCT No.: PCT/JP2018/031252
§ 371 (c)(1),
(2) Date: Feb. 16, 2021

(87) PCT Pub. No.: WO2020/039568
PCT Pub. Date: Feb. 27, 2020

(65) Prior Publication Data
US 2021/0174601 A1    Jun. 10, 2021

(51) Int. Cl.
*G06T 19/00* (2011.01)
*G06T 7/70* (2017.01)
(Continued)

(52) U.S. Cl.
CPC ............ *G06T 19/006* (2013.01); *G06F 3/011* (2013.01); *G06T 7/70* (2017.01); *H04N 13/279* (2018.05)

(58) Field of Classification Search
CPC ........ G06T 19/006; G06T 7/70; H04N 13/279; G06F 3/011
See application file for complete search history.

(56) References Cited

U.S. PATENT DOCUMENTS

| 8,947,455 B2 | 2/2015 | Friesen |
| 8,994,729 B2 | 3/2015 | Nakamura |

(Continued)

FOREIGN PATENT DOCUMENTS

| JP | 2011008350 A | 1/2011 |
| JP | 2013520729 A | 6/2013 |

(Continued)

OTHER PUBLICATIONS

Robertson, Judy, "Story Creation in Virtual Game Worlds" "Communications of the ACM" Jan. 2005, vol. 48, pp. 61-65 ( Year: 2005).*

(Continued)

*Primary Examiner* — Terrell M Robinson
(74) *Attorney, Agent, or Firm* — Matthew B. Dernier, Esq.

(57) ABSTRACT

A contact determination section determines whether or not there is any contact between a body part of a user and an object in a real world. An AR region determination section determines, as an augmented reality region, a region that corresponds to a partial space including a portion of the object in the real world, the portion having been contacted by the body part, and that is viewed from a viewpoint of the user. An AR generation section generates an augmented reality image in the augmented reality region in a shot image of the real world.

13 Claims, 16 Drawing Sheets

(51) Int. Cl.
 *H04N 13/279* (2018.01)
 *G06F 3/01* (2006.01)

(56) References Cited

U.S. PATENT DOCUMENTS

| | | | |
|---|---|---|---|
| 9,761,045 B1* | 9/2017 | Côté | G06T 17/10 |
| 10,255,729 B1* | 4/2019 | Pulitzer | G06T 19/003 |
| 2010/0321383 A1 | 12/2010 | Nakamura | |
| 2011/0205242 A1 | 8/2011 | Friesen | |
| 2013/0038631 A1* | 2/2013 | DeMers | B64D 11/0015 |
| | | | 345/633 |
| 2014/0002491 A1* | 1/2014 | Lamb | G02B 27/017 |
| | | | 345/633 |
| 2016/0217621 A1* | 7/2016 | Raghoebardajal | G06T 19/006 |
| 2016/0259403 A1* | 9/2016 | Wang | G06V 40/11 |
| 2018/0011681 A1* | 1/2018 | Kada | G06F 3/165 |
| 2018/0108179 A1 | 4/2018 | Tomlin | |
| 2019/0108668 A1* | 4/2019 | Shenton | A63F 13/211 |

FOREIGN PATENT DOCUMENTS

| | | | |
|---|---|---|---|
| JP | 2016045815 A | 4/2016 | |
| JP | 2016192137 A | 11/2016 | |

OTHER PUBLICATIONS

International Search Report for corresponding PCT Application No. PCT/JP201/031252, 4 pages, dated Oct. 30, 2018.
International Preliminary Report on Patentability and Written Opinion for corresponding PCT Application No. PCT/JP2018/031252, 14 pages, dated Mar. 4, 2021.

\* cited by examiner

IMAGE GENERATION APPARATUS AND IMAGE GENERATION METHOD FOR GENERATING AUGMENTED REALITY IMAGES BASED ON USER INTERACTION

TECHNICAL FIELD

The present invention relates to an apparatus and a method for generating an image.

BACKGROUND ART

It has been common practice to wear a head-mounted display connected to a game machine on the head and play a game by operating a controller or the like while viewing a screen displayed on the head-mounted display. Wearing the head-mounted display provides effects of increasing a sense of immersion in a video world and further enhancing an entertainment property of the game, since the user views nothing other than the video displayed on the head-mounted display. Further, causing the head-mounted display to display a virtual reality (VR) video and display, when the user wearing the head-mounted display turns the head, a 360-degree view of an entire circumferential virtual space further increases a sense of immersion in the video and improves operability of an application such as a game.

Further, although the user wearing a head-mounted display of a non-transmissive type cannot directly view the outside world, there is also a video-transmissive (video see-through) head-mounted display that can shoot a video of the outside world using a camera mounted in the head-mounted display and display the video on a display panel. The video-transmissive head-mounted display can also generate and display an augmented reality (AR) video by superimposing a virtual world object generated using computer graphics (CG) on the video of the outside world shot by the camera. An augmented reality video is different from a virtual reality, which is disconnected from the real world, in that the augmented reality video is augmentation of the real world with a virtual object and enables the user to experience the virtual world while the user is aware of a connection with the real world.

SUMMARY

Technical Problem

Upon displaying an augmented reality video on the head-mounted display, suddenly superimposing a virtual world object generated using CG on a video of the outside world shot by the camera mounted in the head-mounted display results in a discontinuous connection between the real world and the virtual world. This may, in some cases, give the user a feeling of strangeness.

The present invention has been made in view of the above-described issue. It is an object of the present invention to provide an image generation apparatus and an image generation method that can reduce the feeling of strangeness toward an augmented reality video.

Solution to Problem

In order to solve the above-described issue, an image generation apparatus according to one aspect of the present invention includes an image generation apparatus including a contact determination section configured to determine whether or not there is any contact between a body part of a user and an object in a real world, an augmented reality region determination section configured to determine, as an augmented reality region, a region that corresponds to a partial space including a portion of the object in the real world and viewed from a viewpoint of the user, the portion of the object having been contacted by the body part, and an augmented reality generation section configured to generate an augmented reality image in the augmented reality region in a shot image of the real world.

Another aspect of the present invention is an image generation method. The method includes a contact determination step of determining whether or not there is any contact between a body part of a user and an object in a real world, an augmented reality region determination step of determining, as an augmented reality region, a region that corresponds to a partial space including a portion of the object in the real world and viewed from a viewpoint of the user, the portion of the object having been contacted by the body part, and an augmented reality generation step of generating an augmented reality image in the augmented reality region in a shot image of the real world.

It is noted that any combinations of the components described above and the expressions of the present invention that are converted between a method, an apparatus, a system, a computer program, data structure, a recording medium, and the like are also effective as aspects of the present invention.

Advantageous Effect of Invention

According to the present invention, the feeling of strangeness toward an augmented reality video can be reduced.

DESCRIPTION OF EMBODIMENT

Figure 1:
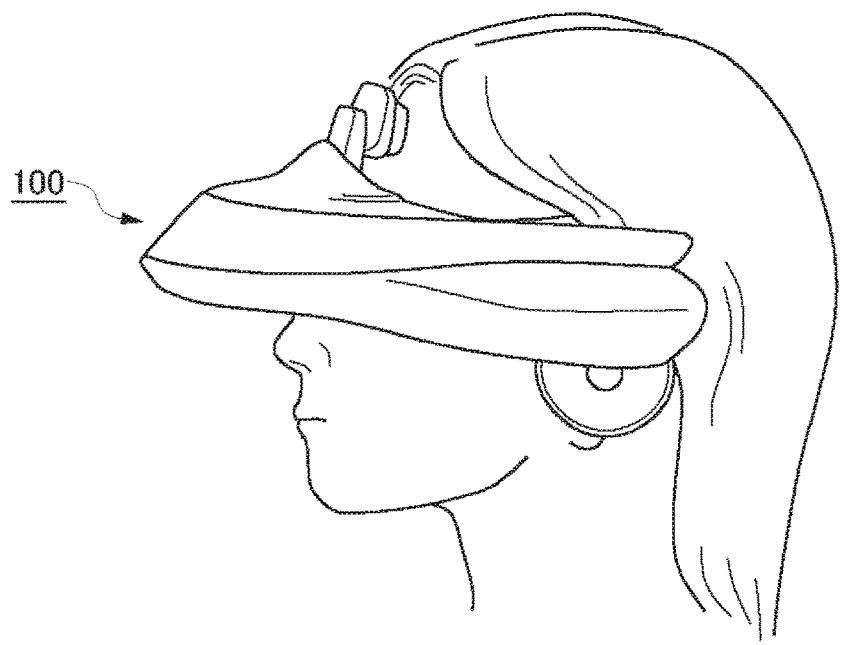
FIG. 1 is an external view of a head-mounted display.

FIG. 1 is an external view of a head-mounted display 100. The head-mounted display 100 is a display apparatus that is worn on the head of the user and allows the user to watch a still image, a moving image, and the like displayed on a display and listen to audio, music, and the like output from headphones.

Position information of the head of the user wearing the head-mounted display 100 and orientation information such as the rotation angle and inclination of the head can be measured by a gyro sensor, an acceleration sensor, and the like incorporated in or externally attached to the head-mounted display 100.

The head-mounted display 100 is provided with a camera unit that can shoot the outside world while the user wears the head-mounted display 100.

The head-mounted display 100 is an example of a "wearable display." Although a method of generating an image to be displayed on the head-mounted display 100 will be described here, the application of the image generation method according to the present embodiment is not limited to the head-mounted display 100 in a narrow sense. The image generation method according to the present embodiment can also be applied to a case where the user wears glasses, a glasses-type display, a glasses-type camera, headphones, a headset (headphones with a microphone), earphones, earrings, an ear-hook camera, a headwear, a headwear with a camera, a hairband, or the like.

Figure 2:
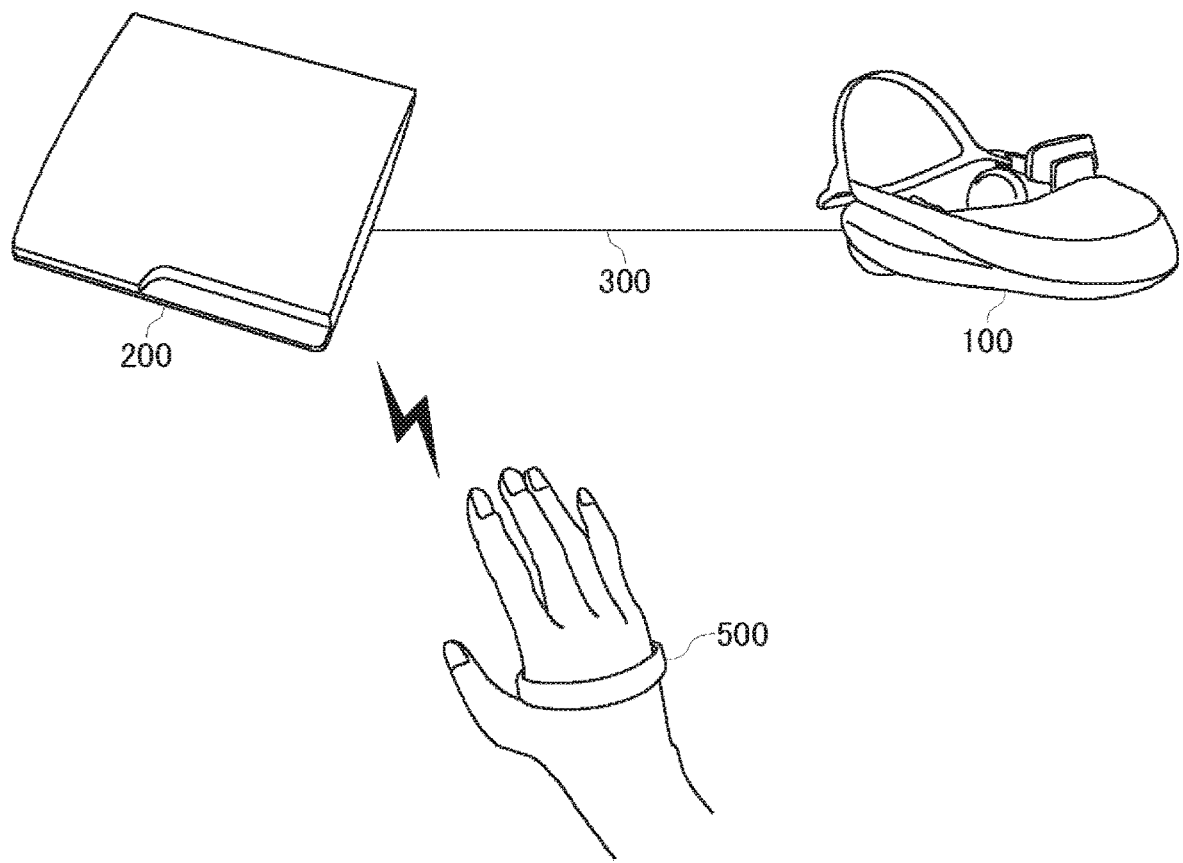
FIG. 2 is a configuration diagram of an image generation system according to the present embodiment.

FIG. 2 is a configuration diagram of an image generation system according to the present embodiment. As an example, the head-mounted display 100 is connected to an image generation apparatus 200 with an interface 300 such as an HDMI (registered trademark) (High-Definition Multimedia Interface), which is a standard of a communication interface that transmits a video and audio as digital signals.

On the basis of current position and orientation information of the head-mounted display 100, the image generation apparatus 200 predicts position and orientation information of the head-mounted display 100, taking into account a delay from the generation of a video to the display thereof. The image generation apparatus 200 then draws an image to be displayed on the head-mounted display 100 on the premise of the predicted position and orientation information of the head-mounted display 100 and transmits the image to the head-mounted display 100.

One example of the image generation apparatus 200 is a game machine. The image generation apparatus 200 may further be connected to a server via a network. In this case, the server may provide the image generation apparatus 200 with an online application such as a game in which a plurality of users can participate over the network. The head-mounted display 100 may be connected to a computer or a mobile terminal instead of the image generation apparatus 200.

An augmented reality region is generated and displayed in a region that corresponds to a partial space including at least a portion, where a body part of the user has contacted an object in the real world, and that is viewed from a viewpoint of the user. The region in which the augmented reality image is displayed will be referred to as an "AR region." For example, in a case where the user's hand has contacted a part of the upper surface of a table in the real world, the entire surface of the table is determined as the partial space, and a region that corresponds to the surface of the table viewed from the viewpoint of the user is determined as the AR region. Superimposing a predetermined effect or an image of a virtual object on an image shot by the camera may generate and display an augmented reality image in the AR region. Alternatively, instead of the image shot by the camera, another CG image may be generated and displayed in the AR region.

In one embodiment, a tracker 500 is worn on the body part of the user. The tracker 500 includes sensors such as an inertial sensor, a magnetic field sensor, an acceleration sensor, and a motion sensor and can detect the position and orientation of the body part of the user. Although the tracker 500 is worn on the user's hand in the example described herein, the tracker 500 may be worn on another body part such as the torso or a leg. It is determined, on the basis of the position and orientation of the body part of the user, whether or not there is any contact between the body part of the user and an object in the real world and which portion of the object has been contacted by the body part. The tracker 500 transmits the position and orientation of the body part of the user to the image generation apparatus 200.

In another embodiment, the image generation apparatus 200 detects the position and orientation of the body part of the user by performing image recognition of the body part of the user in a camera image. Then, the image generation apparatus 200 determines whether or not there is any contact between the body part of the user and an object in the real world and which portion of the object has been contacted by the body part.

Figure 3:
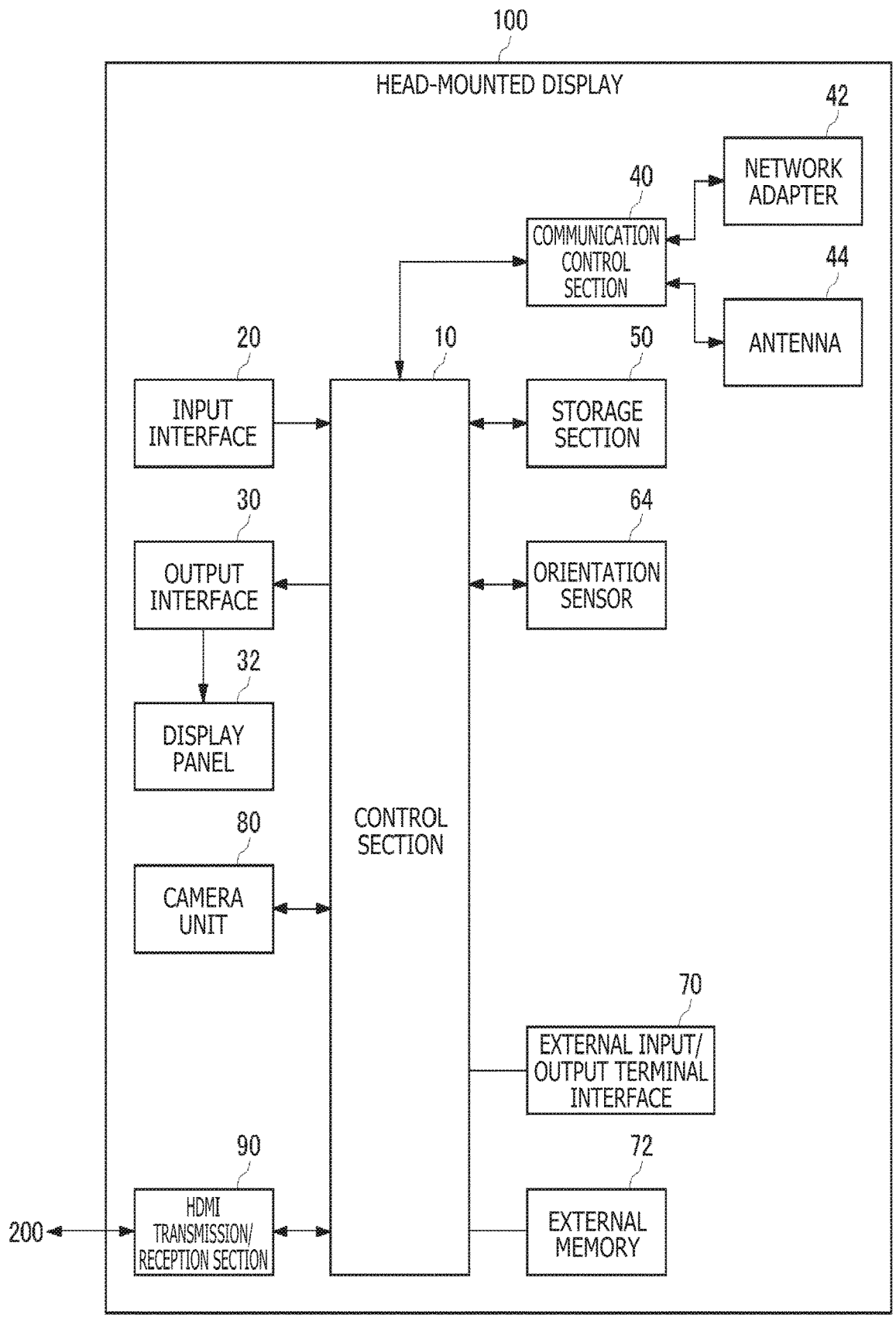
FIG. 3 is a functional configuration diagram of the head-mounted display.

FIG. 3 is a functional configuration diagram of the head-mounted display 100.

A control section 10 is a main processor that processes and outputs signals such as image signals and sensor signals, instructions, and data. An input interface 20 receives operation signals and setting signals from the user and supplies these signals to the control section 10. An output interface 30 receives image signals from the control section 10 and performs display on a display panel 32.

A communication control section 40 transmits data input from the control section 10 to the outside through wired or wireless communication via a network adapter 42 or an antenna 44. The communication control section 40 also receives data from the outside through wired or wireless communication via the network adapter 42 or the antenna 44 and outputs the data to the control section 10.

A storage section 50 temporarily stores data, parameters, operation signals, and the like that are processed by the control section 10.

An orientation sensor 64 detects position information of the head-mounted display 100 and orientation information such as the rotation angle and inclination of the head-mounted display 100. The orientation sensor 64 is implemented by appropriately combining a gyro sensor, an acceleration sensor, an angular acceleration sensor, and the like. The forward and rearward, rightward and leftward, and upward and downward movements of the head of the user may be detected by using a motion sensor implemented by combining at least one or more of a three-axis magnetic field sensor, a three-axis acceleration sensor, and a three-axis gyro (angular velocity) sensor.

An external input/output terminal interface 70 is an interface for connecting peripheral equipment such as a USB (Universal Serial Bus) controller. An external memory 72 is an external memory such as a flash memory.

A camera unit 80 includes configurations necessary for shooting such as a lens, an image sensor, and a range sensor and supplies a video and depth information of the shot outside world to the control section 10. The control section 10 controls a focus, zoom, and the like of the camera unit 80.

An HDMI transmission/reception section 90 transmits and receives digital signals of a video and audio to and from the image generation apparatus 200 according to an HDMI. The HDMI transmission/reception section 90 receives a video and depth information of the outside world shot by the camera unit 80 from the control section 10 and transmits the video and the depth information to the image generation apparatus 200 via an HDMI transmission path. The HDMI transmission/reception section 90 receives an image generated by the image generation apparatus 200 from the image generation apparatus 200 via the HDMI transmission path and supplies the image to the control section 10.

The control section 10 can supply an image and text data to the output interface 30 to cause the display panel 32 to display the image and the text data or can supply the image and the text data to the communication control section 40 to cause the communication control section 40 to transmit the image or the text data to the outside.

The image generation apparatus 200 is notified of the current position and orientation information of the head-mounted display 100 detected by the orientation sensor 64 via the communication control section 40 or the external input/output terminal interface 70. Alternatively, the HDMI transmission/reception section 90 may transmit the current position and orientation information of the head-mounted display 100 to the image generation apparatus 200.

Figure 4:
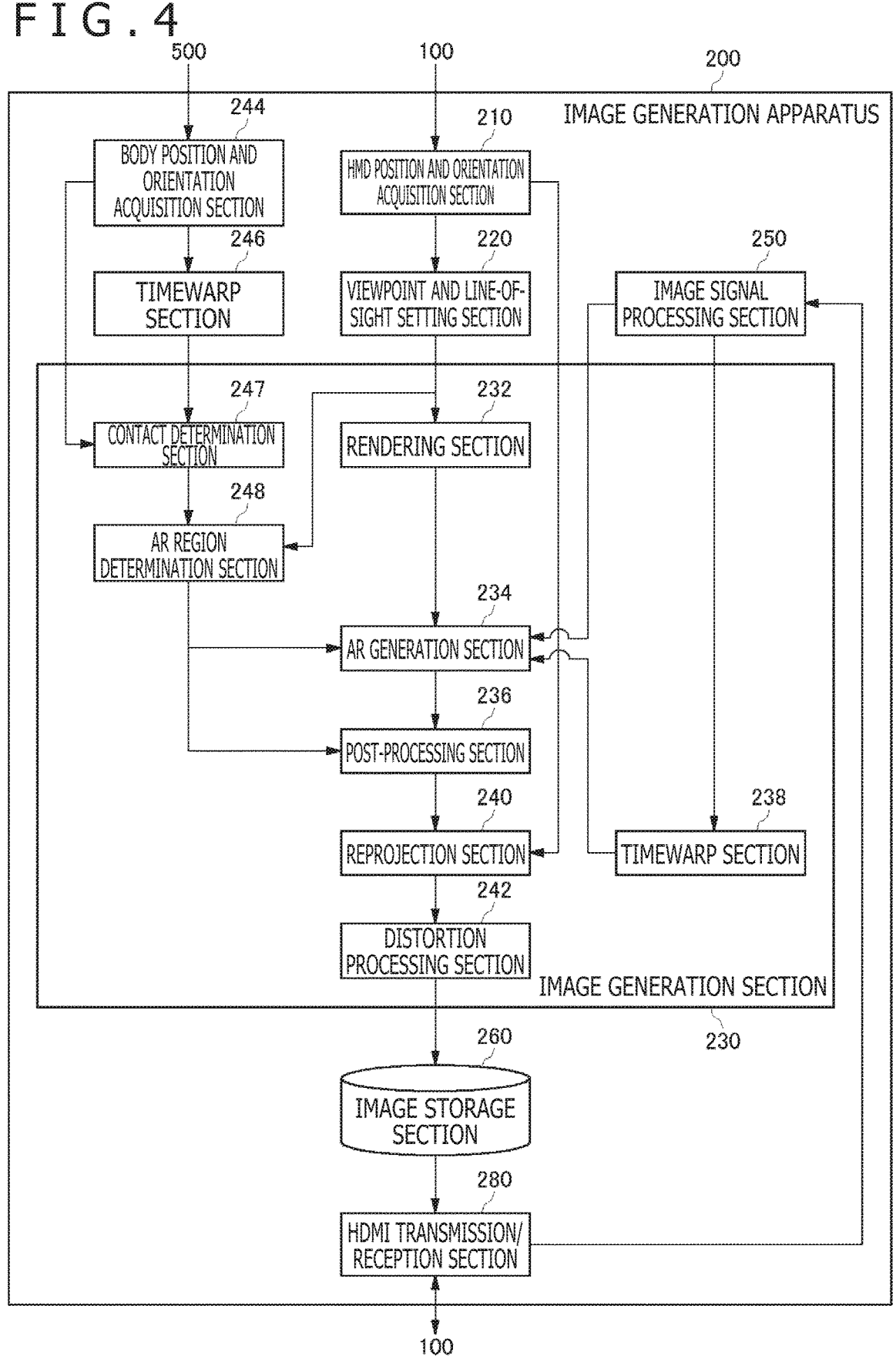
FIG. 4 is a functional configuration diagram of an image generation apparatus according to the present embodiment.

FIG. 4 is a functional configuration diagram of the image generation apparatus 200 according to the present embodiment. This figure illustrates a block diagram focusing on functions, and these functional blocks can be implemented in various forms by hardware only, software only, or a combination thereof.

At least some of the functions of the image generation apparatus 200 may be implemented in the head-mounted display 100. Alternatively, at least some of the functions of the image generation apparatus 200 may be implemented in the server connected to the image generation apparatus 200 via the network.

An HMD position and orientation acquisition section 210 acquires current position and orientation information of the head-mounted display 100 from the head-mounted display 100. The HMD position and orientation acquisition section 210 may acquire an inertial measurement unit (IMU) data which indicates the current orientation information of the head-mounted display 100 from an IMU such as the orientation sensor 64 of the head-mounted display 100, and may estimate the orientation of the user wearing the head-mounted display 100 by performing simultaneous localization and mapping (SLAM) processing using a camera image and the IMU data. The SLAM processing is processing in which self-position estimation and environment map creation are performed simultaneously.

A viewpoint and line-of-sight setting section 220 sets the viewpoint position and line-of-sight direction of the user, using the position and orientation information of the head-mounted display 100 acquired by the HMD position and orientation acquisition section 210.

A body position and orientation acquisition section 244 acquires the position and orientation of a body part of the user and supplies the position and orientation of the body part to a timewarp section 246 and a contact determination section 247. In one embodiment, the body position and orientation acquisition section 244 acquires the position and orientation of the body part of the user detected by the tracker 500. In another embodiment, the body position and orientation acquisition section 244 acquires the position and orientation of the body part by performing image recognition of the body part in the shot image.

On the basis of a difference between a timestamp at the point in time of acquisition of the position and orientation of the tracker 500 and a timestamp at the point in time of estimation of the position and orientation of the head-mounted display 100, the timewarp section 246 transforms the position and orientation of the body part such that the position and orientation of the body part correspond to the timestamp at the point in time of estimation of the position and orientation of the head-mounted display 100.

An HDMI transmission/reception section 280 receives a video of the real space shot by the camera unit 80 from the head-mounted display 100 and supplies the video to an image signal processing section 250.

The image signal processing section 250 performs image signal processing (ISP) such as red-green-blue (RGB) conversion (demosaicing), white balance, color correction, and noise reduction on a Raw image shot by the camera unit 80 of the head-mounted display 100. The image signal processing section 250 further performs distortion correction processing on the Raw image to remove distortion and the like caused by an optical system of the camera unit 80. The image signal processing section 250 supplies an RGB image on which the image signal processing and the distortion correction processing have been performed to an image generation section 230.

The image generation section 230 generates a CG image by reading data necessary to generate CG from an image storage section 260 and rendering a virtual space object. The image generation section 230 then generates an augmented reality image by superimposing the generated CG image on a camera image of the real space provided from the image signal processing section 250 or drawing the CG image instead of the camera image, and outputs the augmented reality image to the image storage section 260.

The image generation section 230 includes the contact determination section 247, the AR region determination section 248, a rendering section 232, an AR generation section 234, a post-processing section 236, a timewarp section 238, a reprojection section 240, and a distortion processing section 242.

The contact determination section 247 determines whether or not there is any contact between the body part of the user and an object in the real world. The contact determination section 247 can perform the contact determination by comparing the position and orientation of the body part with shape information and depth information of the object in the real world. In a case where a contact condition is satisfied, the contact determination section 247 notifies the AR region determination section 248 of a portion of the object in the real world, the portion having been contacted by the body part.

The shape information and depth information of an object in the real world can be acquired by three-dimensional (3D) scanning a real-world space. For example, depth information of the real space can be acquired using a depth sensor employing a method such as an infrared pattern, Structured Light, or time of flight (TOF). Alternatively, depth information of the real space can be acquired from parallax information of a stereo camera.

The AR region determination section 248 acquires the viewpoint position and line-of-sight direction of the user from the viewpoint and line-of-sight setting section 220 and acquires, from the contact determination section 247, information indicating the portion of the object in the real world, the portion having been contacted by the body part. The AR region determination section 248 determines, as the AR region, a region that corresponds to a partial space including at least the portion of the object in the real world, the portion having been contacted by the body part, and that is viewed from the viewpoint position and line-of-sight direction of the user. The AR region determination section 248 then supplies information indicating the AR region to the AR generation section 234 and the post-processing section 236.

The AR region determination section 248 determines, as the AR region, a region that corresponds to a certain partial space including the portion of the object in the real world, the portion having been contacted by the body part, and that is viewed from the viewpoint position and line-of-sight direction of the user. The AR region determination section 248 may select a partial space within a predetermined distance range from the contacted portion as the partial space including the contacted portion. Alternatively, the AR region determination section 248 may select the entire surface of the contacted object as the partial space. The position and size of the AR region change according to the viewpoint position and line-of-sight direction of the user with respect to this partial space.

According to the viewpoint position and line-of-sight direction of the user set by the viewpoint and line-of-sight setting section 220, the rendering section 232 renders a virtual space object that is visible in the line-of-sight direction from the viewpoint position of the user wearing the head-mounted display 100. The rendering section 232 then gives the virtual space object to the AR generation section 234.

Further, the rendering section 232 may apply an effect to a body part of the user, such as a hand, that appears in a camera video or may replace this body part with a virtual model.

The AR generation section 234 generates an augmented reality image by superimposing the CG image generated by the rendering section 232 on the camera image which is supplied from the image signal processing section 250 or drawing, instead of the camera image, the CG image in the AR region specified by the AR region determination section 248 in the camera image. The AR generation section 234 then gives the augmented reality image to the post-processing section 236.

The post-processing section 236 performs post-processing such as depth-of-field adjustment, tone mapping, and anti-aliasing on the augmented reality image in such a manner that the augmented reality image obtained by superimposing the virtual object on the image of the real space looks natural and smooth. Further, the post-processing section 236 may apply various kinds of effects to the AR region specified by the AR region determination section 248. The post-processing section 236 may simply apply an effect to the camera image in the AR region without a CG image being superimposed or drawn for replacement in the AR region by the AR generation section 234.

The reprojection section 240 receives the latest position and orientation information of the head-mounted display 100 from the HMD position and orientation acquisition section 210 and performs reprojection processing on the augmented reality image on which the post-processing has been performed, to convert the image into an image that is visible from the latest viewpoint position and line-of-sight direction of the head-mounted display 100.

Here, reprojection will be described. Assume that the head-mounted display 100 has a head tracking function and that a virtual reality video is generated such that the viewpoint and the line-of-sight direction are changed in association with the movement of the head of the user. In this case, since there is a delay from the generation of the virtual reality video to the display thereof, a deviation occurs between the direction of the head of the user used as a premise at the time of generation of the video and the direction of the head of the user at the time when the video is displayed on the head-mounted display 100. Such a deviation may, in some cases, make the user feel as if the user got motion sickness (called VR sickness or the like).

In this manner, it takes time until the movement of the head-mounted display 100 is detected, a central processing unit (CPU) issues a drawing command, a graphics processing unit (GPU) performs rendering, and the drawn image is output to the head-mounted display 100. Assume that drawing is performed at a frame rate of 60 fps (frames/second), for example, and there is a delay of one frame until the image is output after the movement of the head-mounted display 100 is detected. This delay is approximately 16.67 milliseconds under a frame rate of 60 fps, which is sufficient time for a human to perceive the deviation.

Therefore, processing called "timewarp" or "reprojection" is performed to correct the rendered image according to the latest position and orientation of the head-mounted display 100. This makes a human less likely to perceive the deviation.

The distortion processing section 242 performs distortion processing on the augmented reality image on which the reprojection processing has been performed by deforming (distorting) the image according to the distortion caused by the optical system of the head-mounted display 100. The distortion processing section 242 then stores the resulting image in the image storage section 260.

The HDMI transmission/reception section 280 reads frame data of the augmented reality image which has been generated by the image generation section 230 from the image storage section 260 and transmits the frame data to the head-mounted display 100 according to the HDMI.

On the basis of the difference between the timestamp at the point in time of camera shooting and the timestamp at the point in time of acquisition of the position and orientation of the head-mounted display 100, the timewarp section 238 transforms the camera image supplied from the image signal processing section 250 such that the camera image corresponds to the timestamp at the point in time of acquisition of the position and orientation of the head-mounted display 100. The timewarp section 238 then gives the resulting camera image to the AR generation section 234. This timewarp processing is particularly effective in a case where the position and orientation of the body part are detected by image recognition. The AR generation section 234 generates an augmented reality image by superimposing a CG image generated by the rendering section 232 on the timewarped camera image or by drawing a CG image replacing the timewarped camera image. The AR generation section 234 then gives the augmented reality image to the post-processing section 236.

Figure 5A:
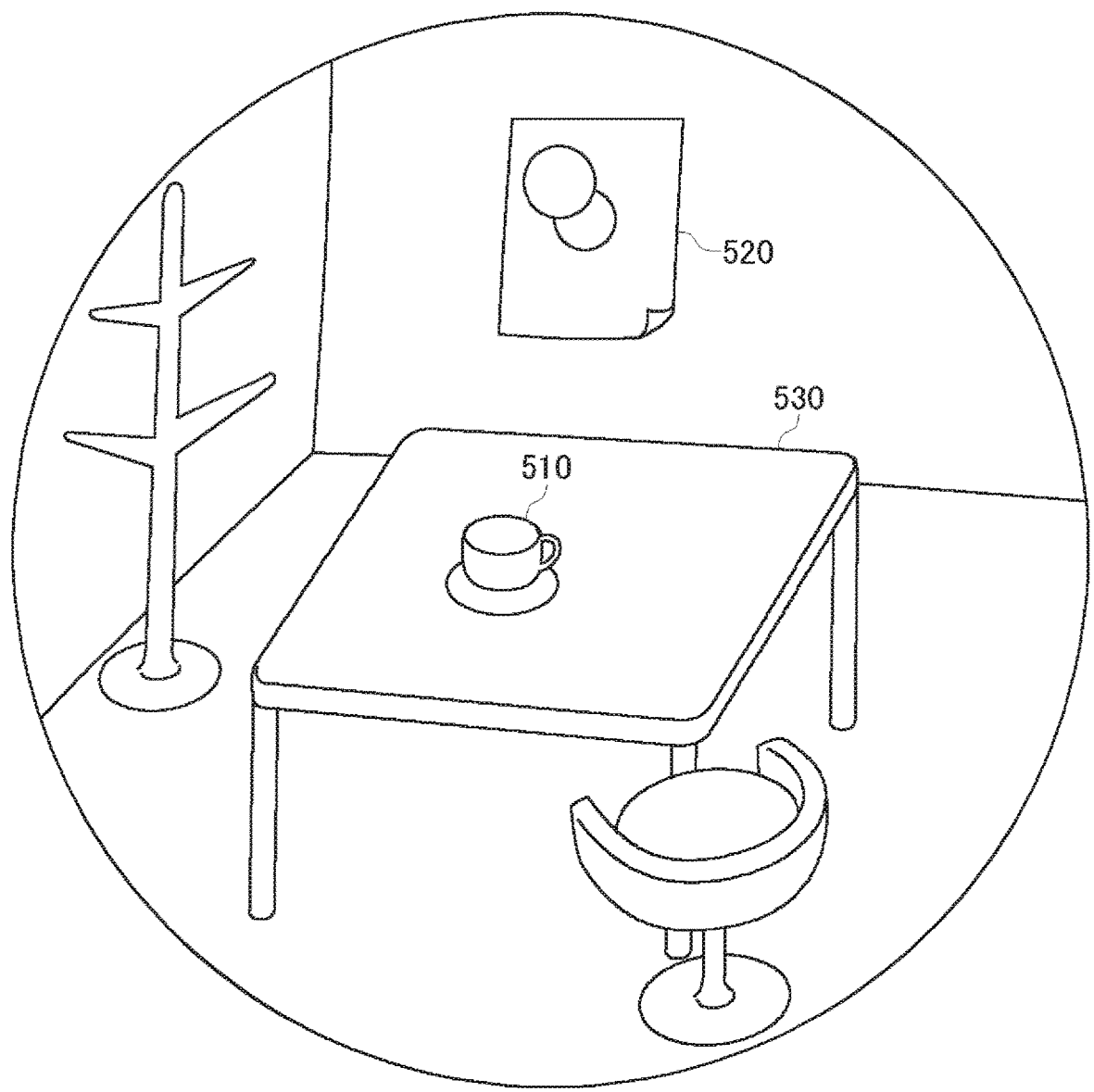
FIG. 5A is a diagram for describing an example of augmented reality image generation performed by an image generation apparatus 200 according to the present embodiment.
Figure 5B:
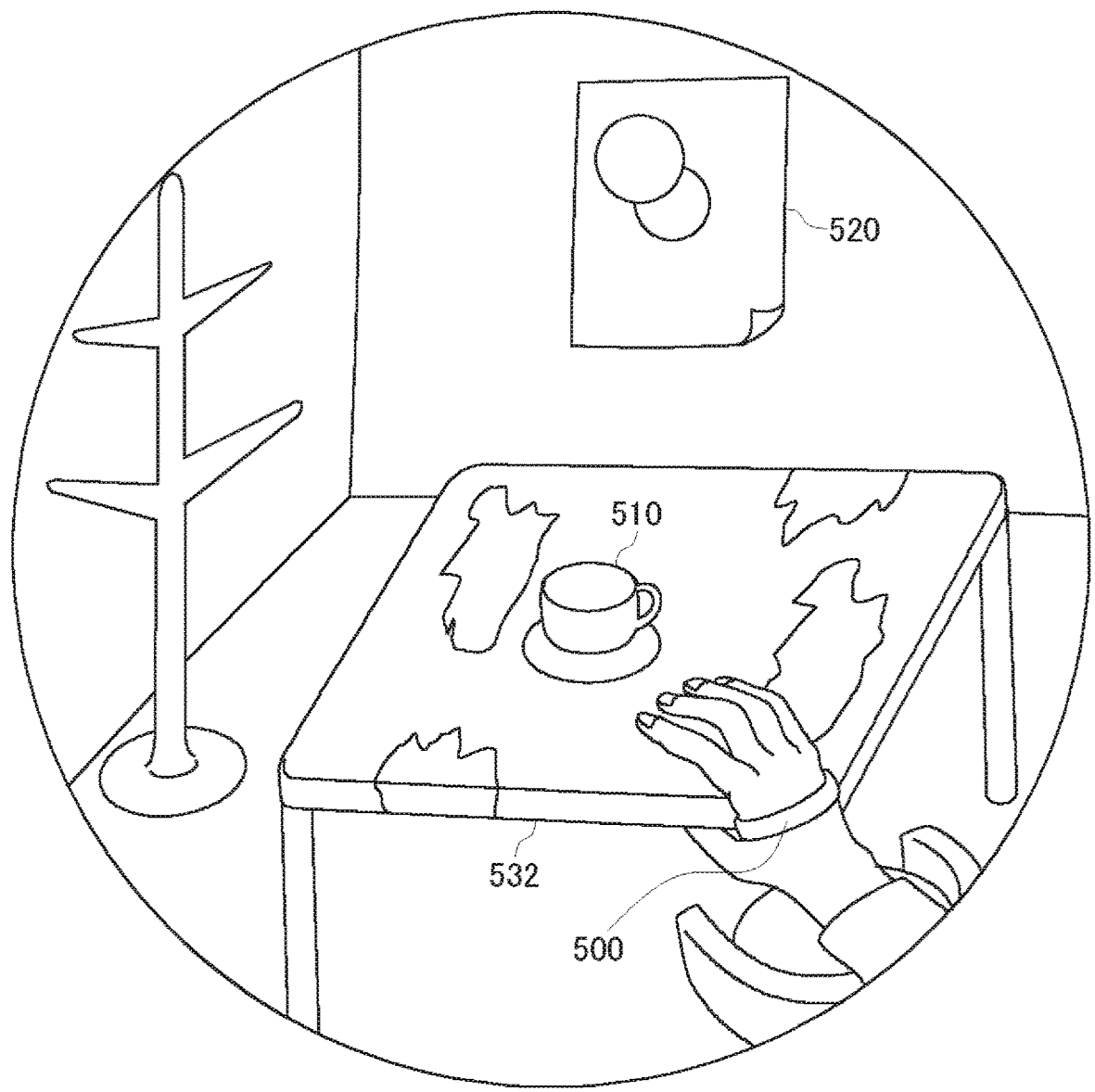
FIG. 5B is a diagram for describing an example of augmented reality image generation performed by the image generation apparatus 200 according to the present embodiment.

FIGS. 5A and 5B are diagrams for describing examples of augmented reality image generation performed by the image generation apparatus 200 according to the present embodiment.

FIG. 5A is a diagram for describing a screen displayed on the display panel 32 of the head-mounted display 100. Here, the head-mounted display 100 is of a video-transmissive type and displays a video of the outside world shot by the camera mounted in the head-mounted display 100.

As can be seen from the video of the outside world, the user is in a room. There are a table 530 and a chair in front of the user. A coffee cup 510 is on the table 530. There is a clothes stand near the wall. Further, there is a poster 520 on the front wall.

FIG. 5B is a screen displayed on the display panel 32 when the user's hand has contacted the table 530 of FIG. 5A. When the user's hand has contacted the upper surface of the table 530 of FIG. 5A, the entire surface of the table 530 including the contacted portion is specified as the partial space, and a region corresponding to this partial space viewed from the viewpoint of the user becomes the AR region. Here, a CG texture is pasted on the surface of the table 530 which is the AR region, through which the table 530 turns into an AR table 532 like the one illustrated in FIG. 5B on the screen. The other region on the screen remains unchanged from the camera image.

In this manner, only the partial space including the portion of the real space, the portion having been contacted by the body part of the user, becomes an augmented reality image on the screen. Accordingly, it is possible to reduce the feeling of discontinuity and strangeness at the time of transition from the camera image to the augmented reality image, allowing the user to have the feeling of physical presence.

What is contacted with an object in the real space is not limited to the user's body part itself. The user may hold a virtual object such as a gun, a sword, a stick, or a shield used in a game and determine the AR region that corresponds to a partial space including a portion of the object in the real space, the portion having been contacted by the virtual object, and that is viewed from the viewpoint.

Figure 6A:
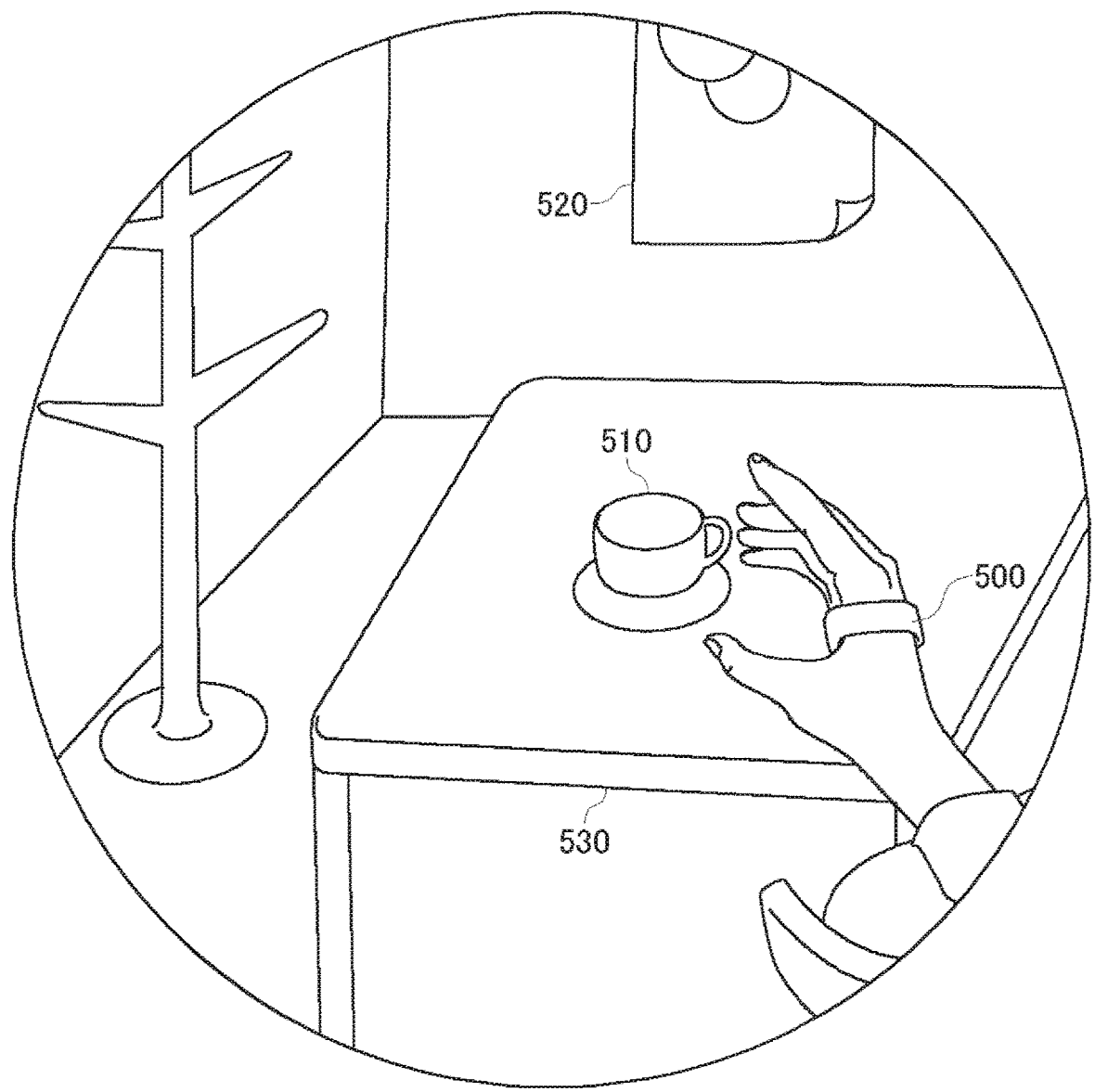
FIG. 6A is a diagram for describing another example of augmented reality image generation performed by the image generation apparatus 200 according to the present embodiment.
Figure 6B:
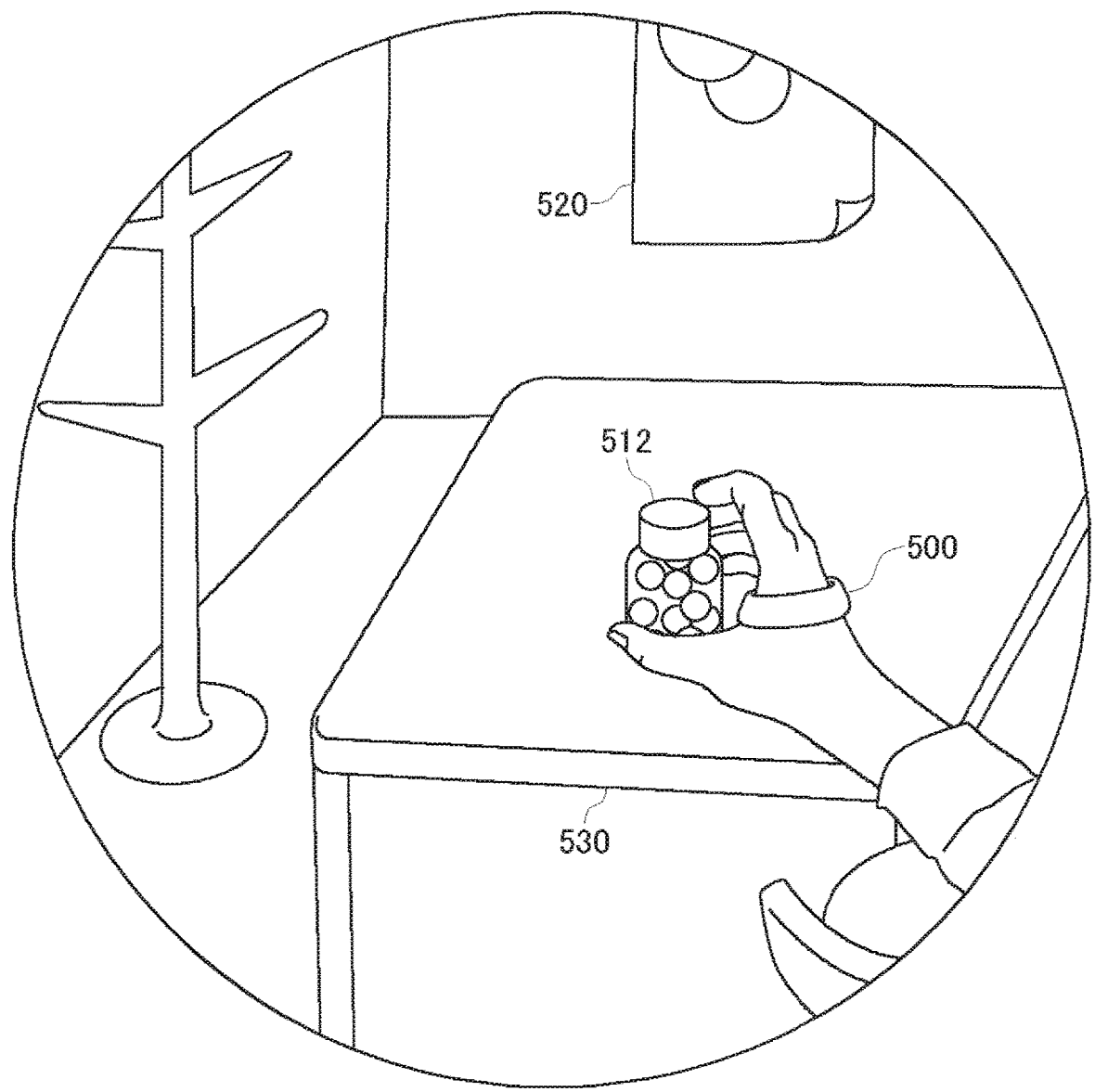
FIG. 6B is a diagram for describing another example of augmented reality image generation performed by the image generation apparatus 200 according to the present embodiment.
Figure 6C:
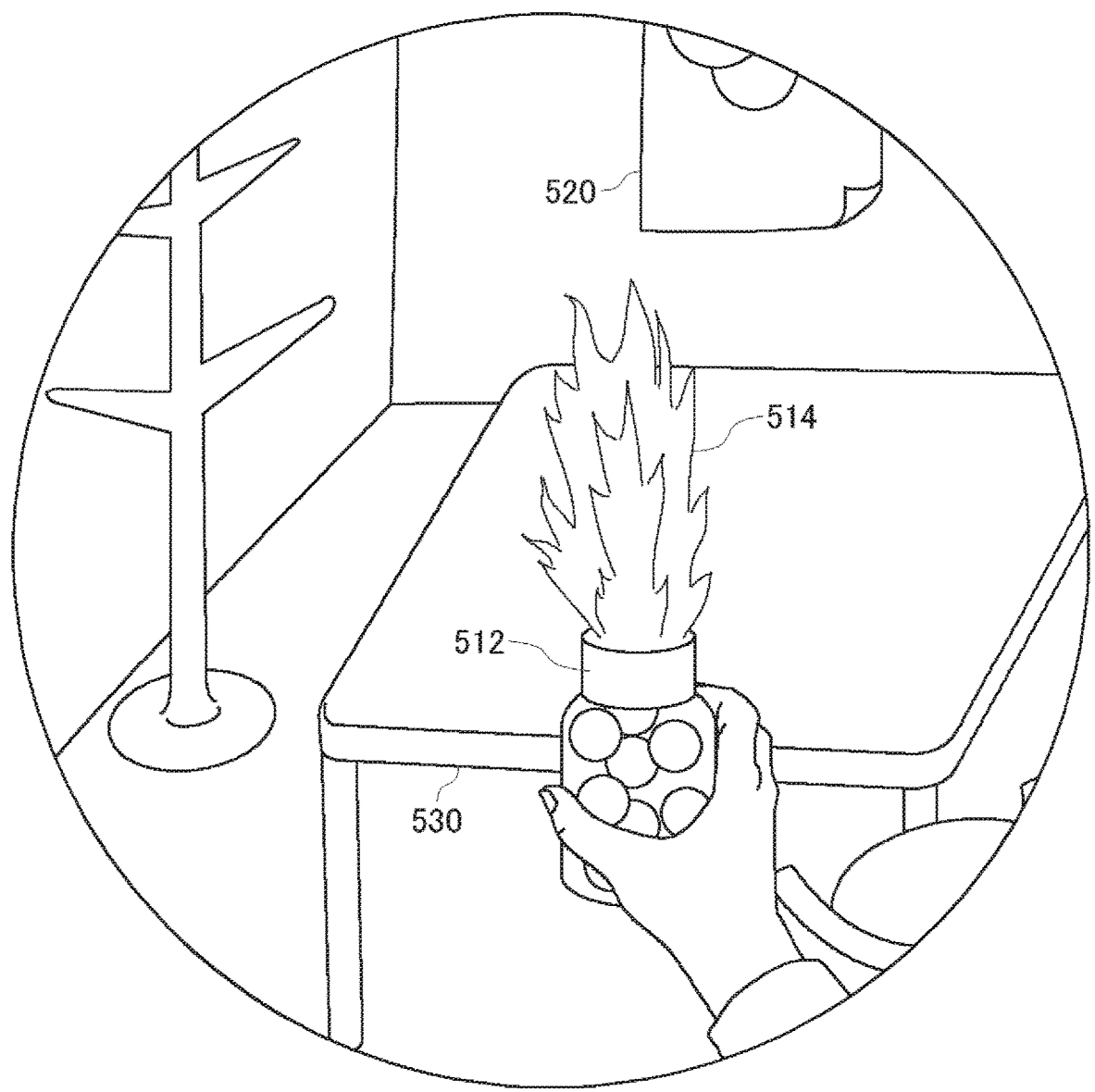
FIG. 6C is a diagram for describing another example of augmented reality image generation performed by the image generation apparatus 200 according to the present embodiment.

FIGS. 6A to 6C are each a diagram for describing another example of augmented reality image generation performed by the image generation apparatus 200 according to the present embodiment.

FIG. 6A illustrates the coffee cup 510 on the table 530 being about to be picked up by the user who is stretching out his/her hand to the coffee cup 510. Since the user's hand has not contacted the coffee cup 510 yet, the real-world coffee cup 510 is visible as it is on the screen.

FIG. 6B illustrates an exemplary screen when the user's hand has contacted the coffee cup 510 of FIG. 6A. When the user's hand has contacted the coffee cup 510, the entire coffee cup 510 is specified as the partial space and a region corresponding to the coffee cup 510 viewed from the viewpoint of the user becomes the AR region. The AR generation section 234 draws a virtual object 512 by replacing the coffee cup 510 with the virtual object 512.

FIG. 6C illustrates an exemplary screen when the user has held up the virtual object 512. The user is holding up the coffee cup 510 in reality, but it appears on the screen that the user is holding up the virtual object 512. Further, an effect is added to the virtual object 512. In this example, a flame 514 is coming out of the virtual object 512.

In the above examples, an AR effect is applied by changing the AR region into a CG image. Alternatively, a video see-through image to which a visual effect filter is applied may be displayed in the AR region. Alternatively, a complete VR image or a VR image that utilizes the real world structure may be displayed in the AR region.

Many variations of effects can also be considered. Examples of effects include generation of particles, application of a visual effect filter, a change of luminance and color, a lens effect, zoom-in/out display, generation of a sound effect, and a change of volume of background music or a sound effect.

Further, a body tracking technique may be used to estimate the position and orientation of the user's body, thereby replacing the user's body appearing in a camera image with another virtual model or adding an effect as if light came out from the user's body appearing in the camera image, for example.

Figure 7A:
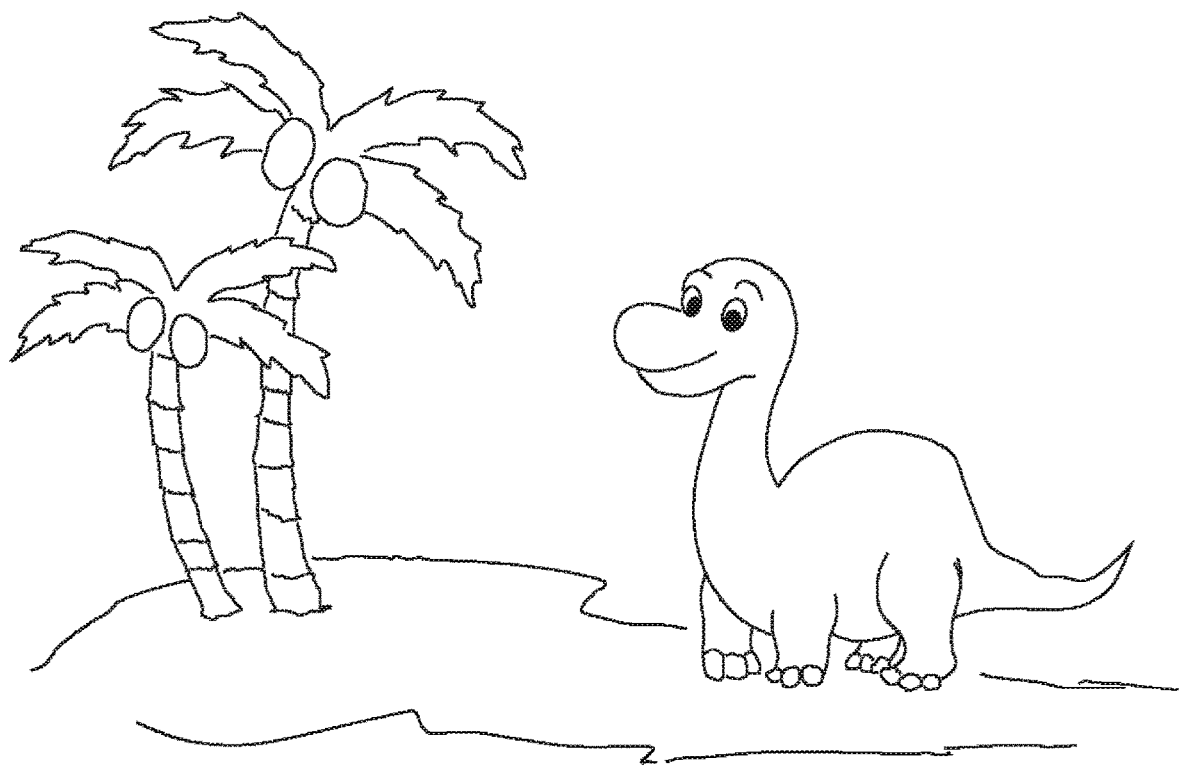
FIG. 7A is a diagram for describing still another example of augmented reality image generation performed by the image generation apparatus 200 according to the present embodiment.
Figure 7B:
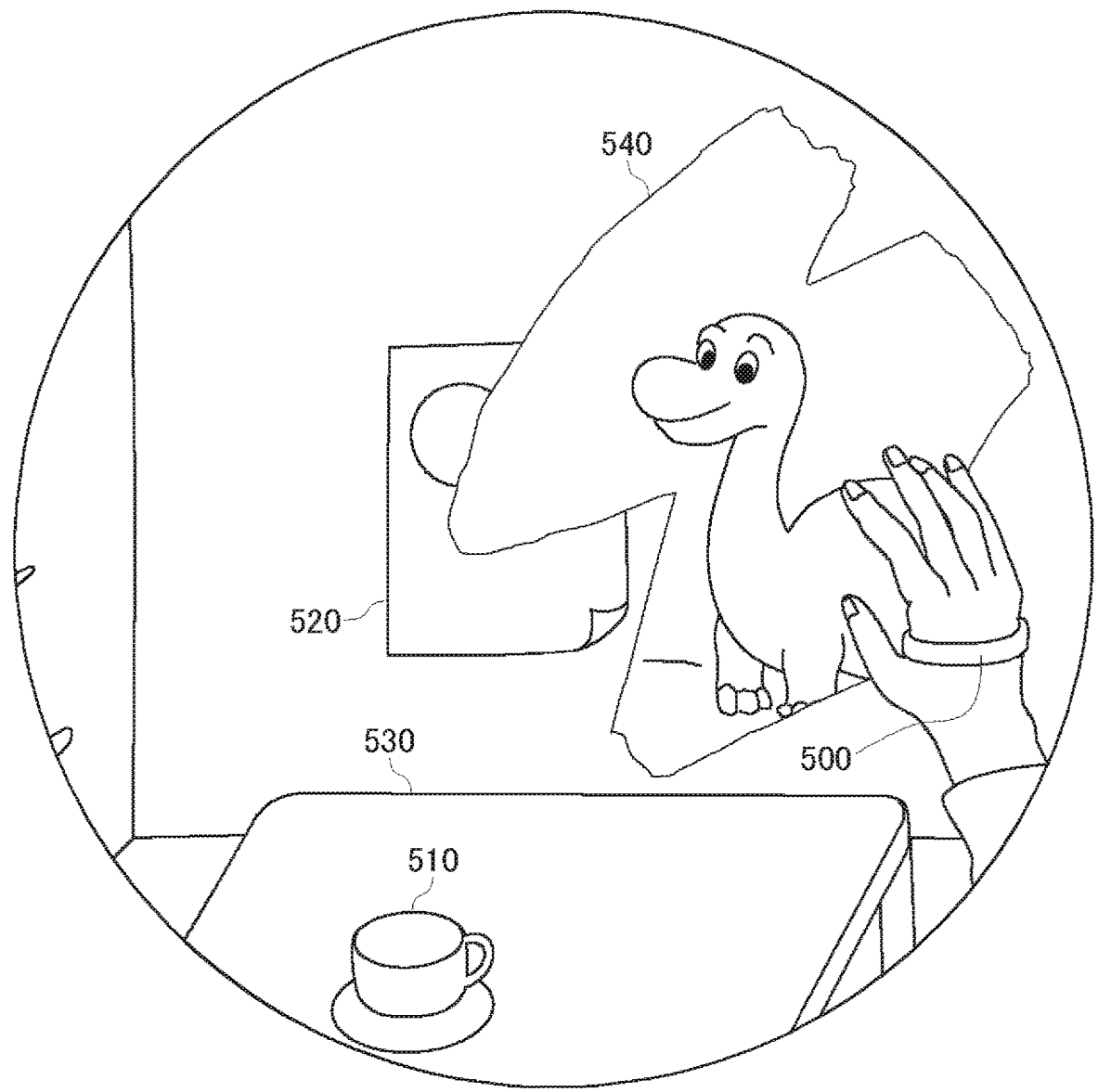
FIG. 7B is a diagram for describing still another example of augmented reality image generation performed by the image generation apparatus 200 according to the present embodiment.
Figure 7C:
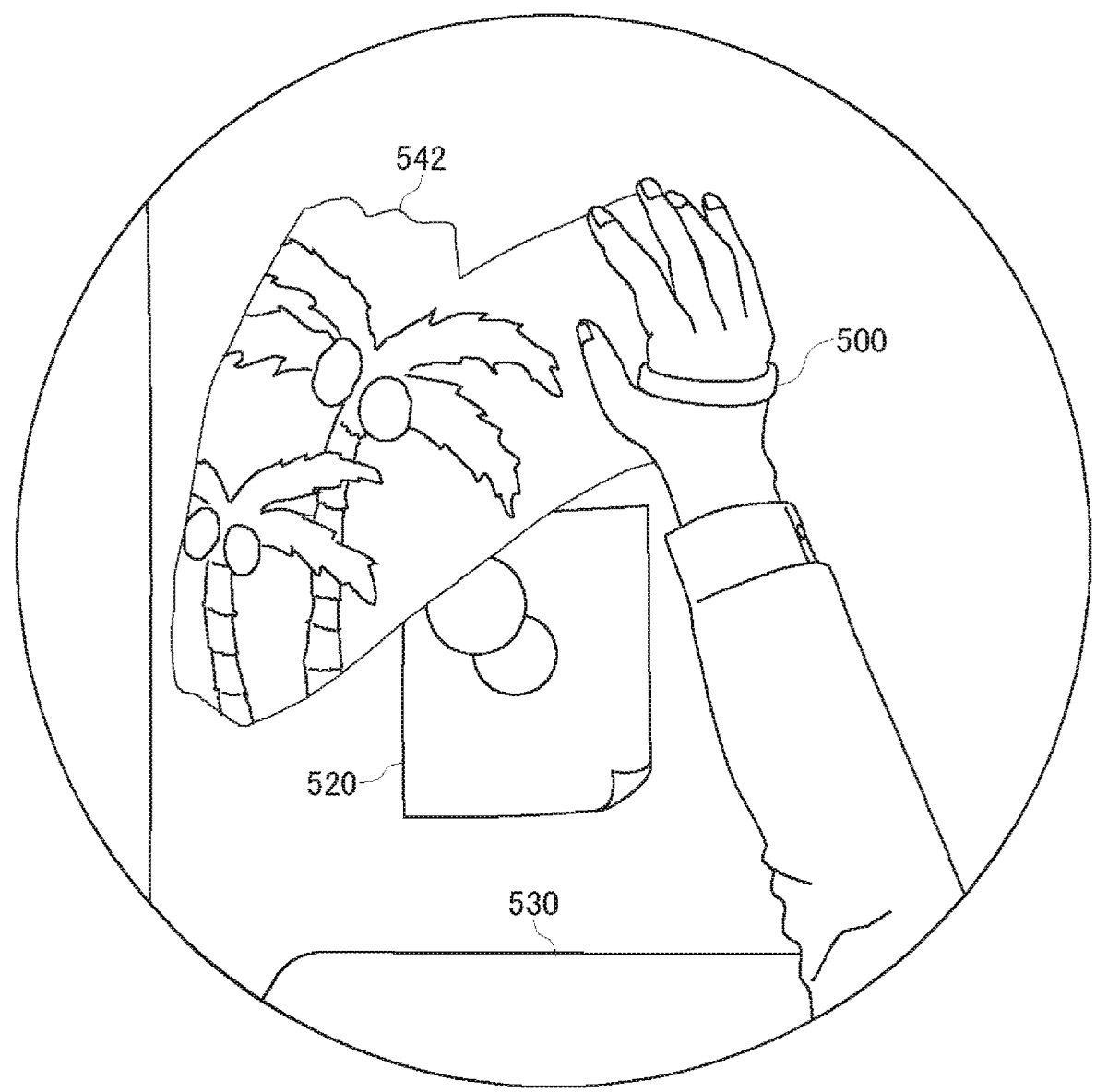
FIG. 7C is a diagram for describing still another example of augmented reality image generation performed by the image generation apparatus 200 according to the present embodiment.

FIGS. 7A to 7C are diagrams for describing still other examples of augmented reality image generation performed by the image generation apparatus 200 according to the present embodiment.

Although the user is in the room described with reference to FIG. 5A, a virtual space, like the one illustrated in FIG. 7A, exists outside the room. Here, a dinosaur is standing by two trees in the virtual space.

As illustrated in FIG. 7B, when the user's hand has contacted the front wall of the room, a portion 540 of the wall which has been contacted by the hand becomes the AR region. It appears that there is a hole in the portion 540 contacted by the hand, inside which the virtual space outside the room is drawn. Here, the dinosaur in the virtual space illustrated in FIG. 7A is visible through the hole of the wall.

As illustrated in FIG. 7C, when the user's hand has contacted another portion 542 of the wall, the other portion 542 of the wall which has been contacted by the hand becomes the AR region and a hole is created. Through the hole, the user can peer into the virtual space. Here, a part of the trees in the virtual space illustrated in FIG. 7A is visible through the hole of the wall.

In this manner, an external virtual world that exists on the opposite side of the real world is visible in the portion contacted by the body part of the user, while a see-through video of the real space is visible in a portion other than the portion contacted by the body part.

By using a portion contacted by the user with the hand as a mirror surface, the real appearance of the user or a character which virtually represents the body of the user may be drawn on the mirror surface. In this manner, only the portion contacted by the user with the hand can turn into a virtual mirror.

Figure 8A:
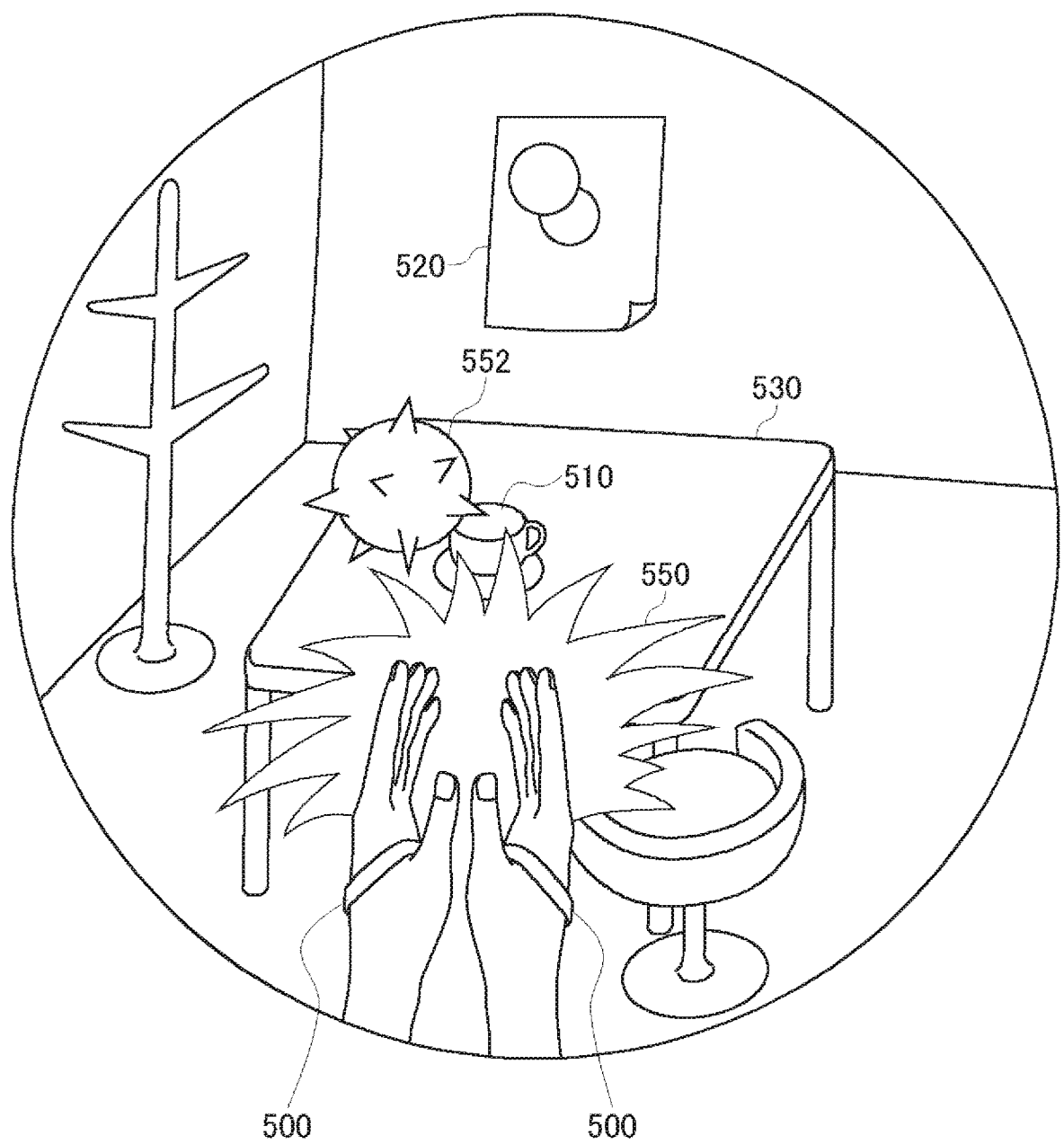
FIG. 8A is a diagram for describing yet another example of augmented reality image generation performed by the image generation apparatus 200 according to the present embodiment.
Figure 8B:
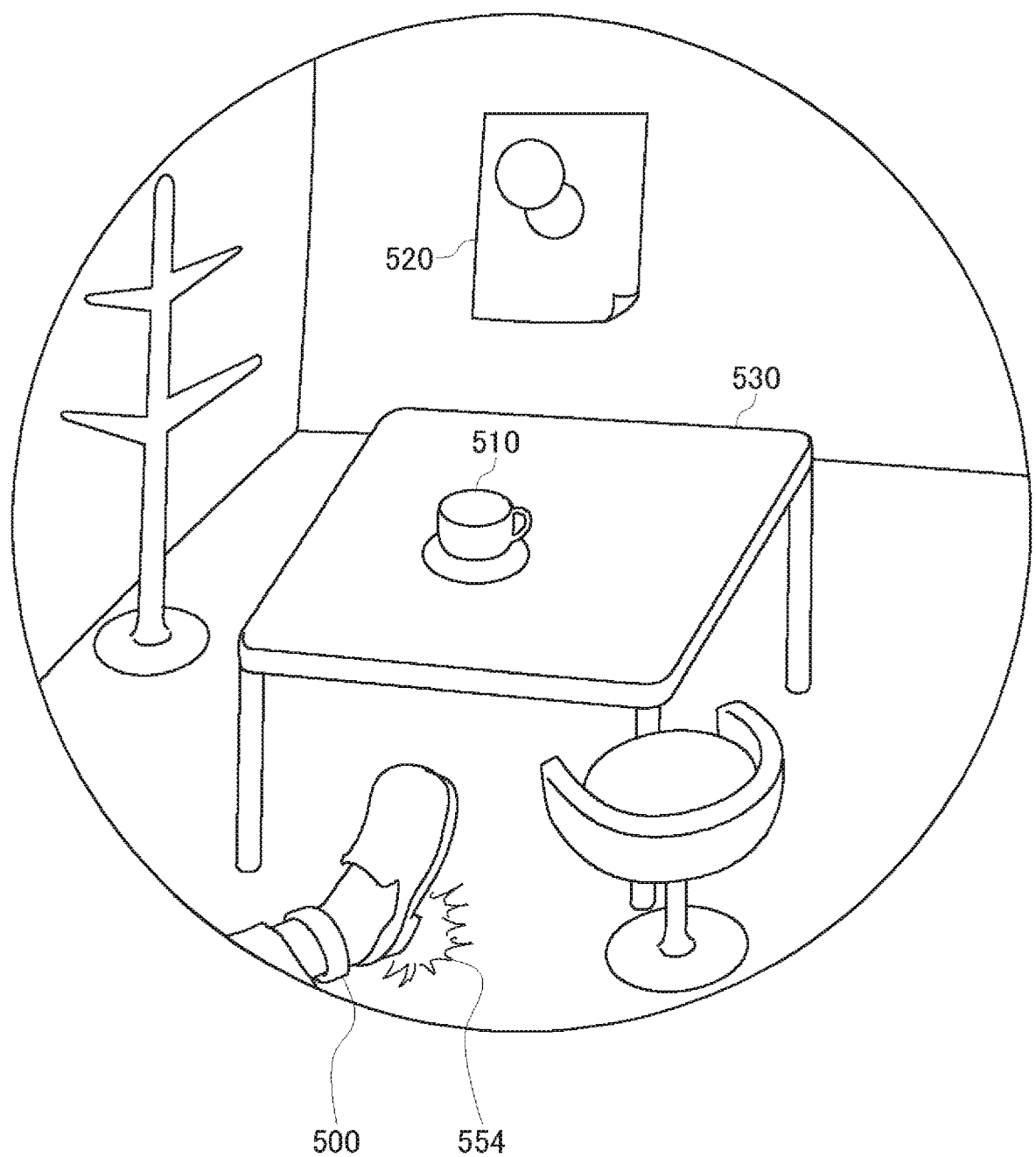
FIG. 8B is a diagram for describing yet another example of augmented reality image generation performed by the image generation apparatus 200 according to the present embodiment.

FIGS. 8A and 8B are diagrams for describing yet other examples of augmented reality image generation performed by the image generation apparatus 200 according to the present embodiment.

FIG. 8A illustrates an exemplary screen when the user has clapped both hands. The user wears the tracker 500 on each of the hands. When the position of the right hand detected by the tracker 500 of the right hand and the position of the left hand detected by the tracker 500 of the left hand have come close to a predetermined distance or less, the contact determination section 247 determines that both hands have contacted with each other. An effect 550 is added to the position where both hands have contacted, and a virtual object 552 comes out of the position where both hands have contacted. In this manner, the AR region determination section 248 may determine, as the AR region, a region where body parts of the user have contacted, and the AR generation section 234 may generate a virtual reality image in the AR region.

FIG. 8B illustrates an exemplary screen when the user has hit the floor with a foot. The user wears the tracker 500 on an ankle. The contact determination section 247 determines whether or not the foot is in contact with the floor on the basis of a distance between the position of the foot detected by the tracker 500 and the position of the floor, to detect that the foot has hit the floor. When the foot has hit the floor, a portion of the floor which has been hit by the foot becomes the AR region, and an effect 554 is added thereto.

In FIGS. 8A and 8B, a sound effect may be added at the same time as or instead of a video effect.

Figure 9:
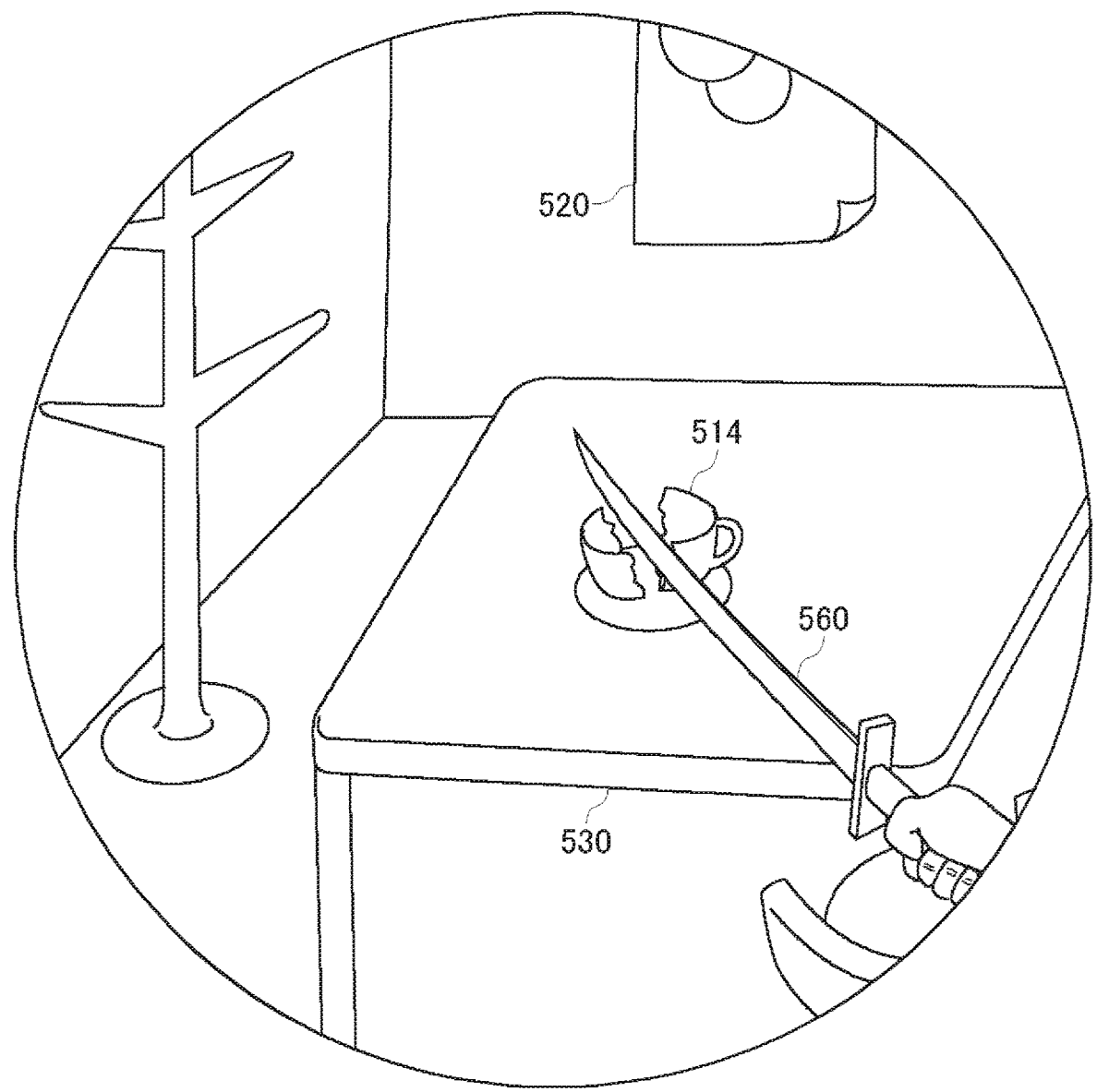
FIG. 9 is a diagram for describing a still further example of augmented reality image generation performed by the image generation apparatus 200 according to the present embodiment.

FIG. 9 is a diagram for describing a still further example of augmented reality image generation performed by the image generation apparatus 200 according to the present embodiment.

FIG. 9 illustrates an exemplary screen when a sword 560 which is a virtual object held by the user has contacted the coffee cup 510 of FIG. 5A. The position of the virtual sword 560 held by the user can be calculated by offsetting position information of the user's hand detected by the tracker 500 worn on the user's hand. When the position of the sword 560 and the position of the coffee cup 510 have come close within a predetermined distance, the contact determination section 247 determines that the sword 560 has contacted the coffee cup 510, and the AR region determination section 248 determines the coffee cup 510 which has been contacted by the sword as the AR region. The AR generation section 234 superimposes an image of a virtual coffee cup 514 split in two on the region of the coffee cup 510.

Figure 10A:
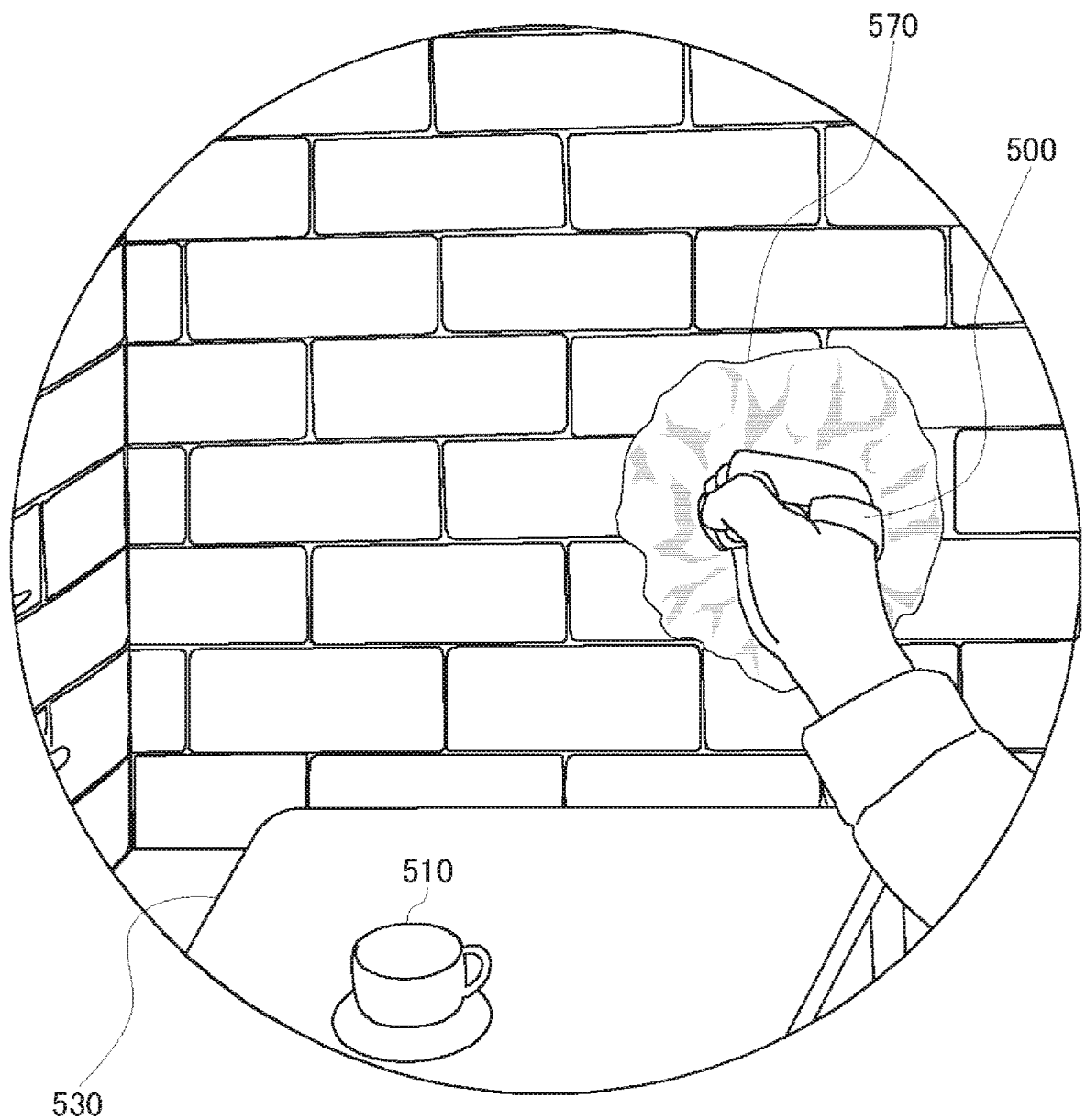
FIG. 10A is a diagram for describing a yet further example of augmented reality image generation performed by the image generation apparatus 200 according to the present embodiment.
Figure 10B:
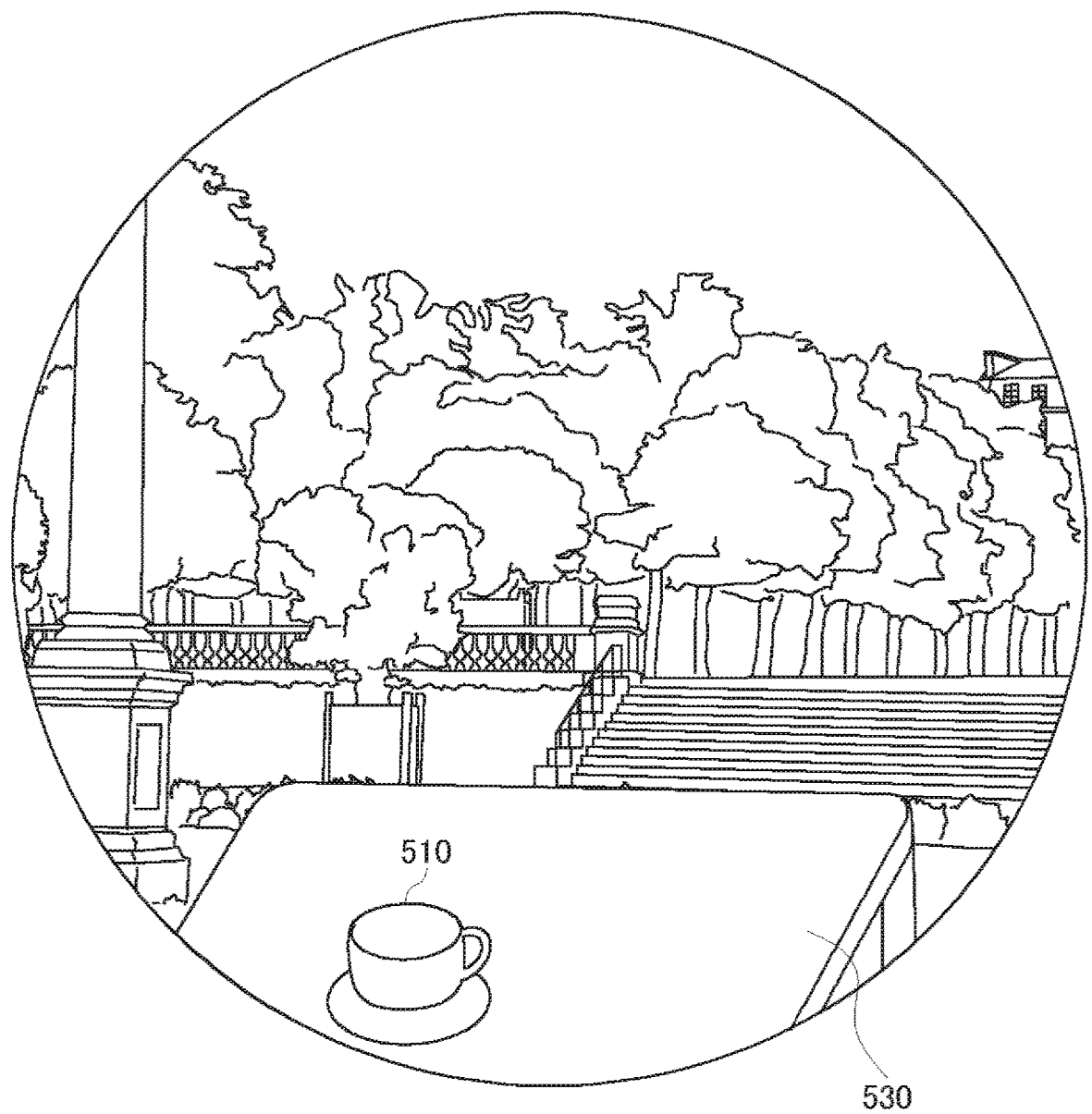
FIG. 10B is a diagram for describing a yet further example of augmented reality image generation performed by the image generation apparatus 200 according to the present embodiment.

FIGS. 10A and 10B are diagrams for describing yet further examples of augmented reality image generation performed by the image generation apparatus 200 according to the present embodiment.

As illustrated in FIG. 10A, when the user has knocked on the wall of the room by the hand, the entire wall becomes the AR region, and a virtual block wall generated according to the shape of the wall in the real world is drawn in CG on the entire wall of the room. Further, an image is drawn in a portion of the wall which has been contacted by the user's hand such that the block wall is broken and a hole is created.

It is also possible to add such a virtual effect that, when the user has further pushed or knocked on the wall, the virtual block wall collapses toward the opposite side of the room wall and the virtual world on the opposite side of the wall is displayed, as illustrated in FIG. 10B.

As described above, with the image generation apparatus 200 according to the present embodiment, a portion of the real space which has been contacted by the body part of the user can be specified as the AR region in which an augmented reality image is generated. The user can freely specify the AR region by freely moving the body part and making contact with the real space. With this configuration, an AR effect is added to the region contacted by the body part of the user, instead of being suddenly added to a camera image. Accordingly, it is possible to reduce the feeling of strangeness at the time of transition from a real video to an augmented reality video, offering the feeling of physical presence.

The present invention has been described above on the basis of the embodiment. The embodiment is an exemplification, and it will be understood by those skilled in the art that various modifications can be made to combinations of each component and each processing process in the embodiment and that such modifications also fall within the scope of the present invention.

REFERENCE SIGNS LIST

10 Control section, 20 Input interface, 30 Output interface, 32 Display panel, 40 Communication control section, 42 Network adapter, 44 Antenna, 50 Storage section, 64 Orientation sensor, 70 External input/output terminal interface, 72 External memory, 80 Camera unit, 100 Head-mounted display, 200 Image generation apparatus, 210 HMD position and orientation acquisition section, 220 Viewpoint and line-of-sight setting section, 230 Image generation section, 232 Rendering section, 234 AR generation section, 236 Post-processing section, 238 Timewarp section, 240 Reprojection section, 242 Distortion processing section, 244 Body position and orientation acquisition section, 246 Timewarp section, 247 Contact determination section, 248 AR region determination section, 250 Image signal processing section, 260 Image storage section, 280 HDMI transmission/reception section, 300 Interface, 500 Tracker.

INDUSTRIAL APPLICABILITY

The present invention can be used for an image generation technique.

The invention claimed is:
1. An image generation apparatus comprising:
a contact determination section configured to determine whether or not there is any contact between a body part of a user and an object in a real world;
an augmented reality region determination section configured to determine, as an augmented reality region, a region that corresponds to a partial space including a portion of the object in the real world and viewed from a viewpoint of the user, the portion of the object having been contacted by the body part; and
an augmented reality generation section configured to generate an augmented reality image in the augmented reality region in a shot image of the real world,
wherein the augmented reality generation section generates the augmented reality image in the augmented reality region by drawing, in the augmented reality region, a part of a virtual space as if viewed through an aperture created in the augmented reality region from the viewpoint of the user being on one side of the hole, in order that it appears to the user that a virtual world exists on an opposite side of the aperture.

2. The image generation apparatus according to claim 1, further comprising:
an acquisition section configured to acquire a position and an orientation of the body part, wherein the contact determination section determines whether or not there is any contact between the body part and the object in the real world on a basis of the position and the orientation of the body part.

3. The image generation apparatus according to claim 2, wherein the acquisition section acquires the position and the orientation of the body part detected by a tracker provided on a body of the user.

4. The image generation apparatus according to claim 3, further comprising: a timewarp section configured to transform the position and the orientation of the body part detected by the tracker such that the position and the orientation of the body part correspond to a point in time of acquisition of a viewpoint position and a line-of-sight direction of the user.

5. The image generation apparatus according to claim 2, wherein the acquisition section acquires the position and the orientation of the body part detected by image recognition from the shot image.

6. The image generation apparatus according to claim 5, further comprising: a timewarp section configured to transform the shot image such that the shot image corresponds to a point in time of acquisition of a viewpoint position and a line-of-sight direction of the user.

7. The image generation apparatus according to claim 1, wherein the augmented reality generation section generates the augmented reality image according to a shape of the real world.

8. The image generation apparatus according to claim 1, wherein the augmented reality generation section applies an effect to the shot image in the augmented reality region in addition to or instead of superimposing a computer graphics image on the augmented reality region.

9. The image generation apparatus according to claim 1, wherein, a user operation controls at least one of a size, a shape and a position of the aperture through which the virtual world appears.

10. The image generation apparatus according to claim 1, wherein the user operation is a gesture.

11. The image generation apparatus according to claim 1, wherein the shape of the aperture is controlled by the gesture.

12. An image generation method comprising:
determining whether or not there is any contact between a body part of a user and an object in a real world;
determining, as an augmented reality region, a region that corresponds to a partial space including a portion of the object in the real world and viewed from a viewpoint of the user, the portion of the object having been contacted by the body part; and
generating an augmented reality image in the augmented reality region in a shot image of the real world,
wherein the generating generates the augmented reality image in the augmented reality region by drawing, in the augmented reality region, a part of a virtual space as if viewed through an aperture created in the augmented reality region from the viewpoint of the user being on one side of the hole, in order that it appears to the user that a virtual world exists on an opposite side of the aperture.

13. A non-transitory, computer readable storage medium containing a program, which when executed by a computer, causes the computer to perform an image generation method by carrying out actions, comprising:
determining whether or not there is any contact between a body part of a user and an object in a real world;
determining, as an augmented reality region, a region that corresponds to a partial space including a portion of the object in the real world and viewed from a viewpoint of the user, the portion of the object having been contacted by the body part; and
generating an augmented reality image in the augmented reality region in a shot image of the real world,
wherein the generating generates the augmented reality image in the augmented reality region by drawing, in the augmented reality region, a part of a virtual space as if viewed through an aperture created in the augmented reality region from the viewpoint of the user being on one side of the hole, in order that it appears to the user that a virtual world exists on an opposite side of the aperture.

* * * * *